United States Patent
Hozumi et al.

(10) Patent No.: US 8,886,413 B2
(45) Date of Patent: Nov. 11, 2014

(54) SEAT APPARATUS FOR VEHICLE

(75) Inventors: Soichiro Hozumi, Nagoya (JP); Toshiro Maeda, Anjo (JP); Koji Hattori, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 1874 days.

(21) Appl. No.: 11/941,410

(22) Filed: Nov. 16, 2007

(65) Prior Publication Data

US 2008/0119997 A1 May 22, 2008

(30) Foreign Application Priority Data

Nov. 22, 2006 (JP) ................... 2006-316096

(51) Int. Cl.
*B60N 2/00* (2006.01)
*B60N 2/02* (2006.01)
*B60N 2/44* (2006.01)
*B60G 99/00* (2010.01)

(52) U.S. Cl.
CPC ............... *B60N 2/02* (2013.01); *B60N 2/0244* (2013.01); *B60G 99/002* (2013.01); *B60N 2/449* (2013.01)
USPC ............... 701/49; 701/36; 701/45; 701/400; 701/409; 701/437; 296/65.11; 296/65.12

(58) Field of Classification Search
USPC ........... 701/1, 36, 45, 49, 200, 207, 208, 212, 701/400, 409, 437; 180/268–271, 268–271; 296/63, 65.01, 65.11, 65.12; 340/995.1–995.12, 995.14–995.17, 340/995.19–995.22
See application file for complete search history.

(56) References Cited

U.S. PATENT DOCUMENTS 4,924,162 A * 5/1990 Sakamoto et al. ......... 297/284.9
5,130,622 A * 7/1992 Takizawa et al. ............ 318/265

(Continued)

FOREIGN PATENT DOCUMENTS

| JP | 2750943 B2 * | 5/1998 | ............... A47C 7/40 |
| JP | 2005088834 A * | 4/2005 | ............ B60G 17/015 |
| JP | 2006-59095 | 3/2006 | |
| JP | 2006059095 A * | 3/2006 | ............ B60R 21/00 |

OTHER PUBLICATIONS

U.S. Appl. No. 11/934,975, filed Nov. 5, 2007, Hozumi, et al.
U.S. Appl. No. 11/940,664, filed Nov. 15, 2007, Hozumi, et al.

(Continued)

*Primary Examiner* — Jack W Keith
*Assistant Examiner* — Chuong P Nguyen
(74) *Attorney, Agent, or Firm* — Oblon, Spivak, McClelland, Maier & Neustadt, L.L.P.

(57) ABSTRACT

A seat apparatus for a vehicle, includes a main support control means for moving a side support portion inwardly and outwardly by means of a driving portion depending on a road shape, a support control means for operating the side support portion on the basis of an electronic map data before the vehicle reaches a curve starting point, a distance calculating means for calculating distance between an intersection and the curve starting point on the basis of the electronic map data, the intersection and the curve starting point, a determining means for determining whether or not control of the support control means is executed on the basis of the calculated distance and electronic map data accuracy, a means for executing the control of the support control means on the basis of determination of the determining means, and a means for refraining the control of the support control means.

13 Claims, 6 Drawing Sheets

(56) References Cited

U.S. PATENT DOCUMENTS

| | | | |
|---|---|---|---|
| 5,320,409 A * | 6/1994 | Katoh et al. | 297/284.6 |
| 6,037,731 A * | 3/2000 | Fruehauf et al. | 318/468 |
| 6,720,750 B2 * | 4/2004 | Stachowski et al. | 318/466 |
| 6,873,892 B2 * | 3/2005 | Katz et al. | 701/49 |
| 7,822,523 B2 * | 10/2010 | Yoshida et al. | 701/49 |
| 8,032,284 B2 * | 10/2011 | Hozumi et al. | 701/49 |
| 8,036,796 B2 * | 10/2011 | Hozumi et al. | 701/49 |
| 8,249,781 B2 * | 8/2012 | Hattori et al. | 701/49 |
| 8,478,491 B2 * | 7/2013 | Miyajima et al. | 701/49 |
| 2003/0023363 A1 * | 1/2003 | Katz et al. | 701/49 |
| 2005/0174223 A1 * | 8/2005 | Egami et al. | 340/440 |
| 2006/0273644 A1 * | 12/2006 | Sturt et al. | 297/284.9 |
| 2008/0122272 A1 * | 5/2008 | Aoki et al. | 297/217.2 |

OTHER PUBLICATIONS

U.S. Appl. No. 11/943,316, filed Nov. 20, 2007, Hozumi, et al.

U.S. Appl. No. 11/987,715, filed Dec. 4, 2007, Hozumi, et al.

U.S. Appl. No. 12/016,490, filed Jan. 18, 2008, Hozumi, et al.

* cited by examiner

SEAT APPARATUS FOR VEHICLE

CROSS REFERENCE TO RELATED APPLICATIONS

This application is based on and claims priority under 35 U.S.C. §119 to Japanese Patent Application 2006-316096, filed on Nov. 22, 2006, the entire content of which are incorporated herein by reference.

FIELD OF THE INVENTION

The present invention relates to a seat apparatus for a vehicle including a side support portion that is moved inwardly and outwardly by a driving portion provided at a seat for the vehicle based on an electronic map data.

BACKGROUND

A deceleration control apparatus for a vehicle disclosed in JP 2006059095A judges certainty of a vehicle being driven following a recommended route, which is figured out by the route guidance system, on the basis of, for example, a positional relationship between an intersection and the vehicle, vehicle behavior when the vehicle is approaching the intersection, and operational history of driving. Then the deceleration control apparatus for the vehicle executes an informing (alarming) operation and a deceleration control immediately after the vehicle passes the intersection based on the certainty of the vehicle being driven following the recommended route. In other words, when the recommended route is set by the route guidance system, the deceleration control apparatus preliminary obtains curve information of an interchange exit or a junction before the vehicle approaches to the intersection. Then, when the certainty of the vehicle increases, the deceleration control apparatus for the vehicle executes the informing operation or/and the deceleration control based on the curve information preliminary obtained immediately after the vehicle passes the intersection. The increases in the certainty of the vehicle mean increases in the certainty that the vehicle is driven towards the interchange exit or the junction following to the route guidance system.

In this configuration, the deceleration control apparatus disclosed in JP 2006059095A executes the informing operation and deceleration control quicker than any previous known. Further, the informing operation and the deceleration control are prevented from being improperly executed when a driver of the vehicle does not follow the recommended route and the vehicle is driven towards another route. Hence, it is conceivable that a side support portion may be controlled in the same manner as the deceleration control apparatus for the vehicle controls the informing operation and the deceleration control.

The deceleration control apparatus for the vehicle disclosed in JP2006059095A preliminary obtains the curve information of the recommended route when the vehicle is approaching the intersection. When the certainty of the vehicle being driven following the recommended route increases, the deceleration control apparatus immediately executes the informing operation or the deceleration control after the vehicle passes the intersection based on the curve information. However, the deceleration control apparatus disclosed in JP2006059095A may not prevent improper operations caused by distance errors generated because of accuracy of the curve information or vehicle location information.

A need thus exists for a seat apparatus for a vehicle which is not susceptible to the drawback mentioned above.

SUMMARY OF THE INVENTION

According to an aspect of the present invention, a seat apparatus for a vehicle, includes a main support control means for moving a side support portion in a first direction and in a second direction by means of a driving portion provided at a seat of the vehicle depending on a shape of a road, a support control means for operating the side support portion on the basis of an electronic map data before the vehicle reaches a curve starting point, a distance calculating means for calculating distance between an intersection and the curve starting point on the basis of the electronic map data, the intersection and the curve starting point existing ahead of the vehicle along a driving route, a determining means for determining whether or not control of the support control means is executed the basis of the calculated distance and electronic map data accuracy, a means for executing the control of the support control means on the basis of determination of the determining means, and a means for refraining the control of the support control means on the basis of the determination of the determining means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
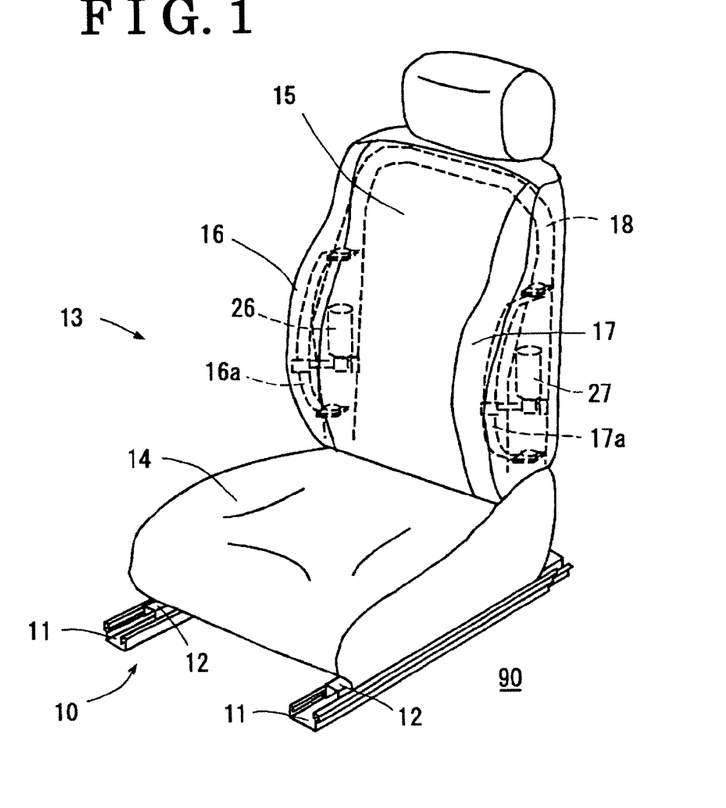
FIG. 1 is a perspective view of a seat apparatus for a vehicle.

An embodiment of a seat apparatus for a vehicle (hereinafter referred to as a seat apparatus) related to the present invention is described in accordance with the attached drawings. As illustrated in FIG. 1, the seat apparatus includes a seat slide device 10 and a seat 13. The seat slide device 10 includes, for example, a part of lower rails 11 and a pair of upper rails 12 supported by the lower rails 11 so as to be slidable thereon. The lower rails are fixed on a floor 90 so as to in a front-rear direction of the vehicle. Specifically, the seat 13 includes a seat cushion 14 on which occupant, for example, a driver is seated, and a seat back 15 that support the driver's back. Further, a right side support portion 16 and a left side support portion 17 are provided at a right and a left portion of the seat back 15 respectively for stabilizing a posture of the driver by pressing the upper body of the driver on its sides. Additionally, a right motor 26 and a left motor 27 are provided at a right and a left portions of a seat frame 18 respectively. Each of the right and the left motors 26 and 27 includes reduction mechanism. Furthermore, a right support frame 16a and a left support frame 17a are adapted to be pivoted by means of the right and the left motors 26 and 27 respectively. Both right and left support frames 16a and 17a are pivoted by the both right and left motors 26 and 27 being driven so that both right and left side support portions 16 and 17 are moved in an opened position, which is indicated with a solid line, and in a closed position, which is indicated with a chain double-dashed line illustrated in FIG. 2, for supporting the upper body of the driver. Additionally, each of the right and the left motors 26 and 27 includes a deceleration mechanism. Hence, the right and the left side support portions 16 and 17 are fixed at a position where movements of the right and the left side support portions 16 and 17 are stopped by cutting off the power feed to the right and the left motors 26 and 27.

Figure 2:
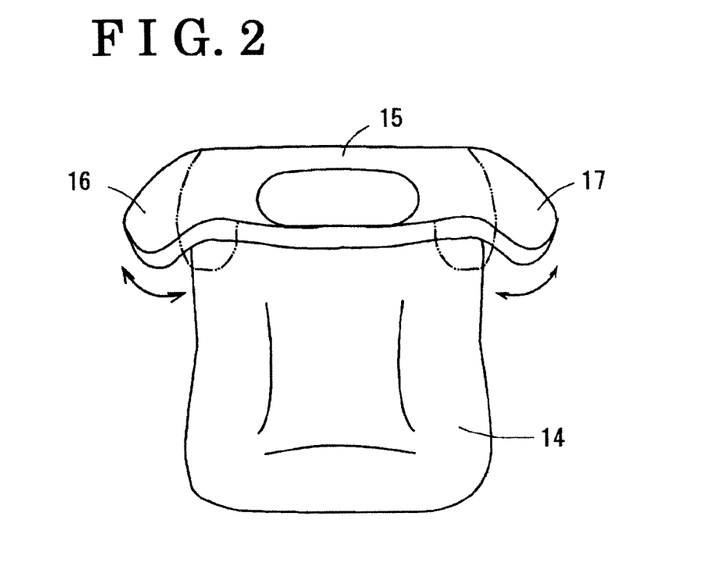
FIG. 2 is a plan view of the seat apparatus for the vehicle.

When the right and the left side support portions 16 and 17 are opened, the right and the left side support portions 16 and 17 are pivoted outwardly so as to be moved away from each other (first direction). When the right and the left side support portions 16 and 17 are closed, the right and the left side support portions 16 and 17 are pivoted inwardly so as to move close to each other (second direction). In addition, the right side support portion 16 and the left side support portion 17 each serves as a side support portion. The right motor 26 and a left motor 27 each serves as driving portions.

Figure 3:
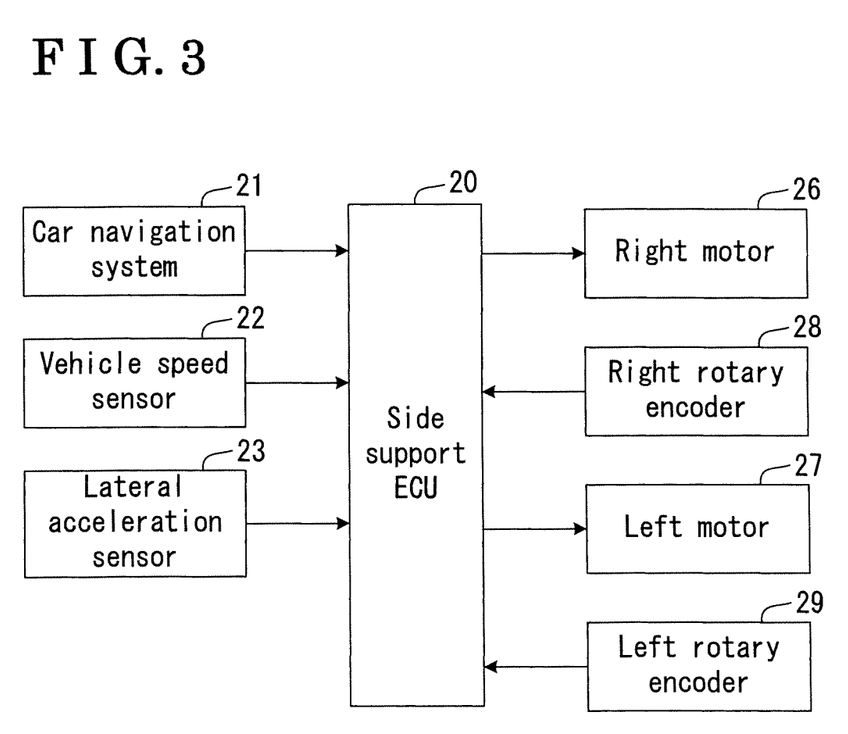
FIG. 3 is a block diagram illustrating an electric connection of the seat apparatus.

A vehicle speed sensor 22, a lateral acceleration sensor 23 and a steering angle sensor 24 are connected to a side support electronic control unit 20 (hereinafter referred to as a side support ECU 20). The side support ECU 20 functions as a distance calculating means, determining means, a means for executing control of preparatory support control means (a means for executing control of support control means), and a means for refraining control of preparatory support control means (a means for refraining control of support means). A detecting signal detected by each of the vehicle speed sensor 22, the lateral acceleration sensor 23 and a steering angle sensor 24 is inputted to the side support ECU 20. The vehicle speed sensor 22 detects vehicle speed. The lateral acceleration sensor 23 detects acceleration of the vehicle in a lateral direction (in a horizontal direction, in a vehicle width direction), that is to say, lateral acceleration. The steering angle sensor 24 detects steering angle.

Additionally, a car navigation system 21 is connected to the side support ECU 20. Information such as a location of a vehicle (vehicle location information) and a map data are successively inputted to the side support ECU 20 from the car navigation system 21. The vehicle location information includes a present location of a vehicle being controlled (hereinafter, referred to simply as a vehicle), and map data including, for example, information of a intersection (intersection) J located in an area predetermined distance Y ahead from the present location of the vehicle in a moving direction of the vehicle, and information of a starting point C of a curve 32. In this embodiment, the vehicle is assumed to be drive on the road having a T-shaped intersection (hereinafter referred to simply as an intersection).

Additionally, the map data contains node coordinates indicating intersections, node data indicating connections between nodes, and link data of links indicating that a road exists between the nodes. The node data includes coordinates, connection nodes, angles between the connected nodes, and the like. The link data includes nodes at a starting point and an ending point of a road and/or a curve, length of the link and the like. Additionally, when the road described by the car navigation system 21 is curved, complementing points are provided on the map data, so that the map data corresponds to the road shape by using an arc formed on the basis of the complementing points or by using short lines connecting the complementing points in order to reduce an error between the actual road shape and the map created by the map data.

Furthermore, the right motor 26, the left motor 27, a right rotary encoder 28 and a left rotary encoder 29 are connected to the side support ECU 20. The side support ECU 20 outputs driving signals to the right and the left motor 26 and 27. Further, the right and the left rotary encoder 28 and 29 provided at the right and the left motors 26 and 27 respectively, output location signals (hereinafter referred to as feedback signals) to the side support ECU 20 for successively feeding back positions of the side support portions 16 and 17 to the side support ECU 20 until the side support portions 16 and 17 are retained at a target closed position.

The side support ECU 20 includes a microcomputer (not shown). Specifically, the microcomputer includes an input-output interface, a CPU, a RAM and a ROM, which are connected to each other via buses (all of which are not shown). The CPU executes programs described in flowcharts of FIGS. 4, 7 and 8 in order to execute a opening and closing control on the right and the left side support portions 16 and 17 of the seat 13. The RAM temporarily memorizes variables number necessary for executing the programs. The ROM memorizes the above-mentioned programs.

A main support control means for executing a main supporting operation of the right and the left side support portions 16 and 17 of the seat apparatus for the vehicle having the above-mentioned configuration based on the lateral acceleration of the vehicle will be described below. The side support ECU 20 repeatedly executes a main support control program corresponding to the flowchart described in FIG. 4 at every predetermined short time when an ignition switch (not shown) is turned on.

Figure 4:
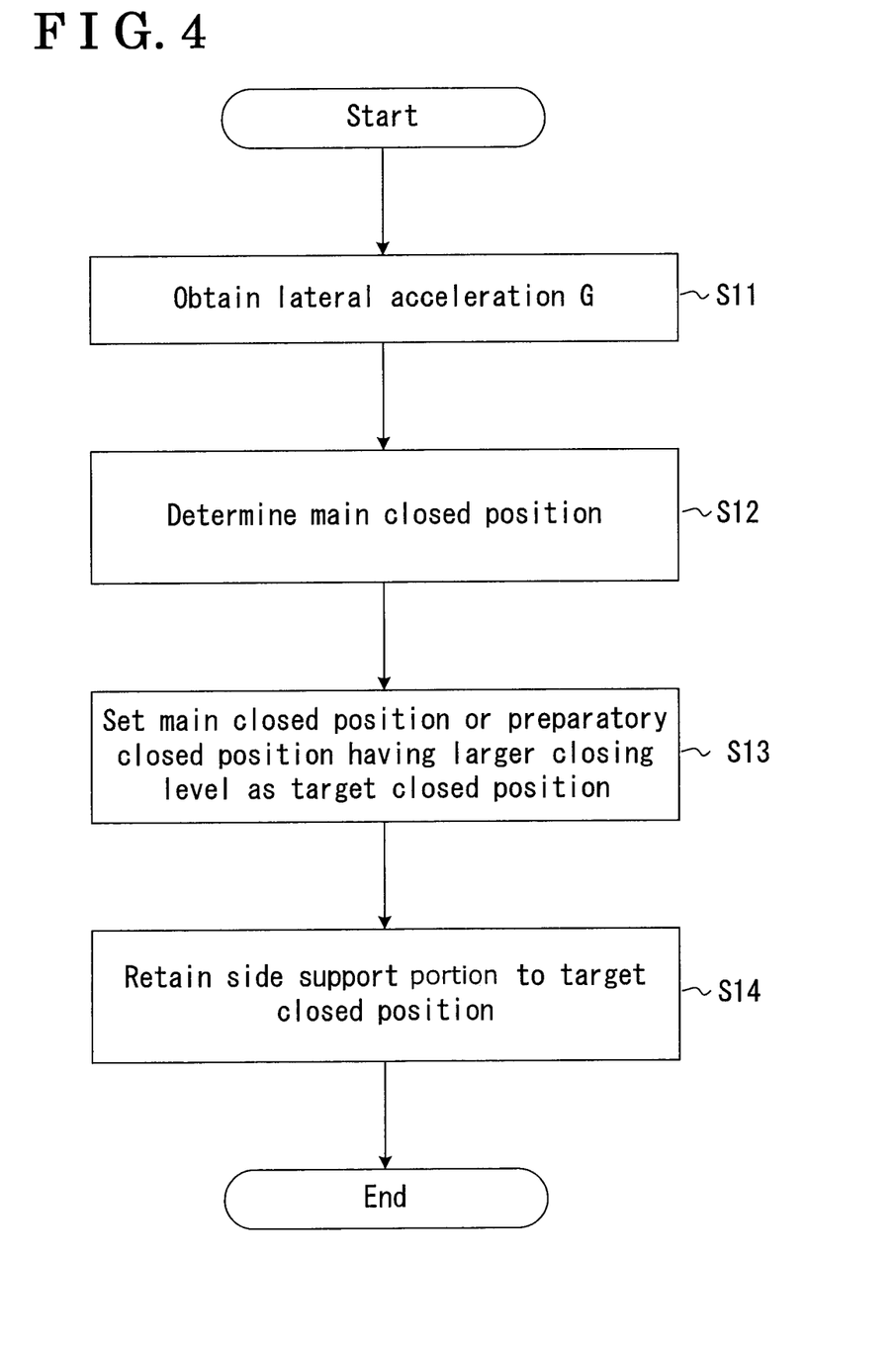
FIG. 4 is a flowchart illustrating a main supporting control program.
Figure 5:
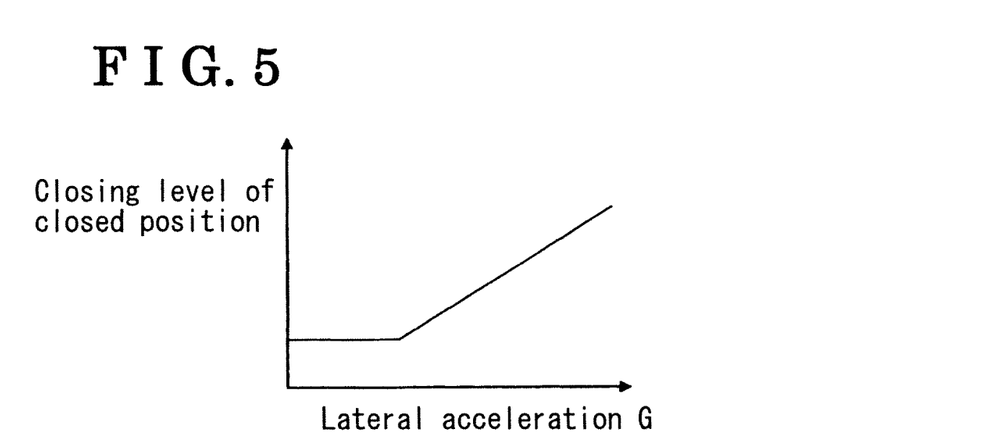
FIG. 5 is a diagram illustrating a relation between lateral acceleration and a closing position of a side support portion.

In step 11 (hereinafter, steps are referred to as "S"), the side support ECU 20 calculates a lateral acceleration G of the vehicle based on detecting signal inputted from the lateral acceleration sensor 23. Then in S12, the side support ECU 20 sets a main closed position of the right and the left side support portions 16 and 17 based on preliminarily memorized relations between the lateral acceleration G and the right and the left side support portions 16 and 17. In S13, the side support ECU 20 sets either the main closed position or a preparatory closed position that has a larger closing level from the present position of the side support portions 16 and 17 as a target closed position. The closing level is an amount of each of the side support portions 16 and 17 being moved. The preparatory closed position is set by a preparatory support control described below. An example of the relation between the lateral acceleration G and the main closed position of each of the right and the left side support portions 16 and 17 is illustrated in FIG. 5. Until the lateral acceleration G reaches a predetermined level, the right and the left side support portions 16 and 17 are retained at the preparatory closed position having a predetermined closing level. The predetermined closing level is an amount that each of the side support portions 16 and 17 are moved from the opened position After the lateral acceleration G exceeds the predetermined level, the closing level of the right and the left side support portions 16 and 17 increases in proportion to the level of the lateral acceleration G. In other words, the right and the left side support portions 16 and 17 are retained to a closed position that corresponds to the level of the lateral acceleration G after the lateral acceleration G exceeds the predetermined level. In S14, the side support ECU 20 drives the right and the left motors 26 and 27 in order to move the right and the left side support portions 16 and 17 inwardly in a closing direction. Then the right and the left side support portions 16 and 17 are retained at the target closing position based on the feedback signals inputted to the side support ECU 20 from the right and the left rotary encoders 28 and 29. Additionally, the lateral acceleration G may be calculated on the basis of a vehicle speed V detected by the vehicle speed sensor 22 and a turning radius R of the vehicle calculated on the basis of a steering angle detected by the steering angle sensor 24. In other words, the lateral acceleration G may be calculated by a formula, $G=V^2/R$.

Described below is the preparatory support control means (support control means) for executing a preparatory supporting operation (supporting operation) to the right and the left side support portions 16 and 17 a predetermined distance before reaching a curve starting point C based on an electronic map data. In this embodiment, the vehicle is assumed to be driven along a route 30 (a driving route) of a road illustrated in FIG. 6 in a vehicle moving direction indicated with an arrow 33. The driver may preliminarily perceive an approach to a curve 32 and the main supporting operation executed for the right and the left side support portions 16 and 17, because the preparatory supporting operation is executed before executing the main supporting operation. The side support ECU 20 repeatedly executes a preparatory support control program illustrated in the flowchart in FIG. 7.

Figure 7:
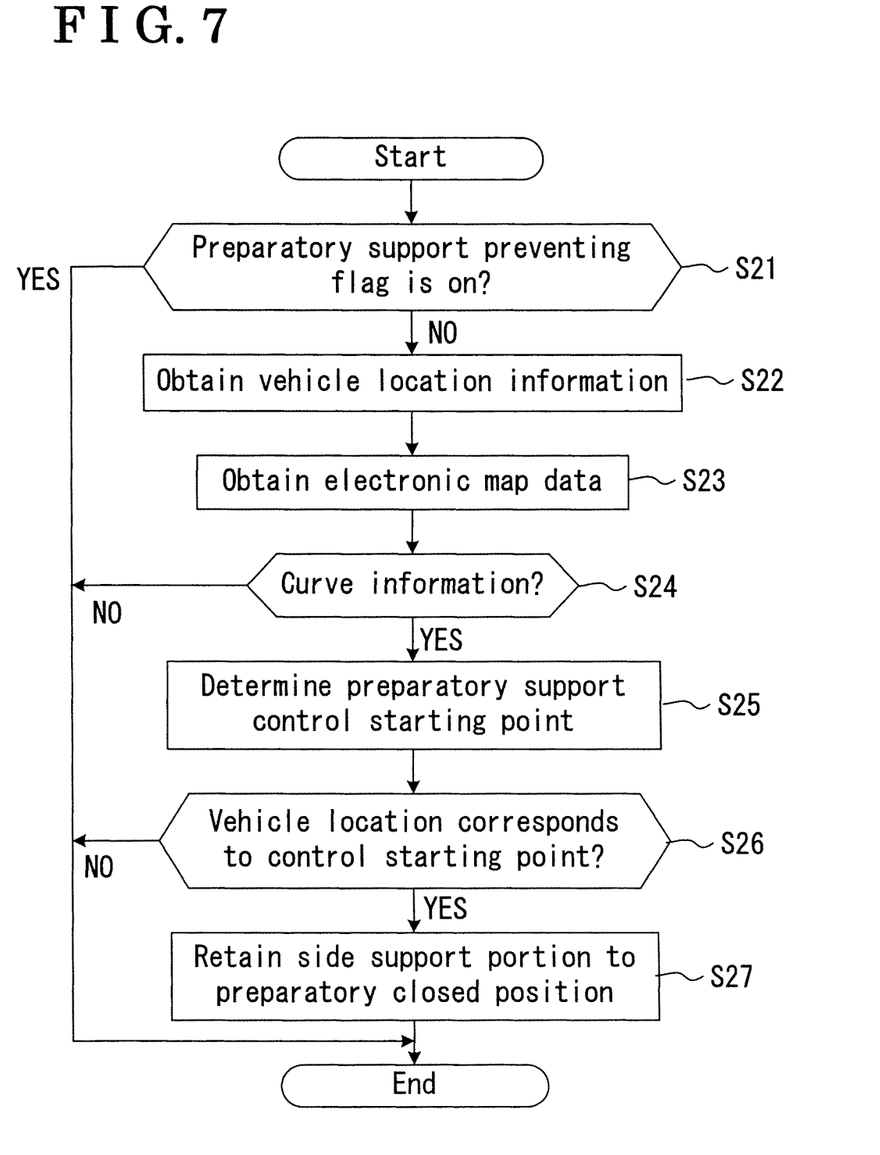
FIG. 7 is a flowchart illustrating a preparatory support control program.

In S21, the side support ECU 20 determines whether a preparatory support control preventing flag is set or cleared. The preparatory support control preventing flag is activated when a preventive program for preventing an improper preparatory supporting operation (hereinafter, referred to as an improper preparatory supporting operation preventing program) is executed in advance to the preparatory supporting control program. When the preparatory support control preventing flag is on, the side support ECU 20 proceeds to a program end without executing the preparatory support control program.

When the preparatory support control preventing flag is off, the side support ECU 20 obtains the vehicle location information including the present location of the vehicle in S22. Then the side support ECU 20 obtains the road information (the electronic map data) of the area the predetermined distance Y ahead the vehicle in the vehicle moving direction in S23. The side support ECU 20 determines "NO" in S24 when the obtained road information is not related to the curve information, and then the side support ECU 20 terminates the preparatory support control program. When the obtained road information includes the information of the curve starting point C, the side support ECU 20 calculates a control starting point F based on the information of the curve starting point C, then the side support ECU 20 memorizes the control starting point F. The control starting point F is a point where the side support ECU 20 starts executing the preparatory support control. The control starting point F is set closer to the vehicle for a predetermined distance L (hereinafter referred to as a distance L) before reaching the curve starting point C, or for a predetermined time calculated on the basis of the vehicle speed V and the distance between the vehicle location and the curve starting point C. Additionally, the set distance L may be set to 0.

Figure 6:
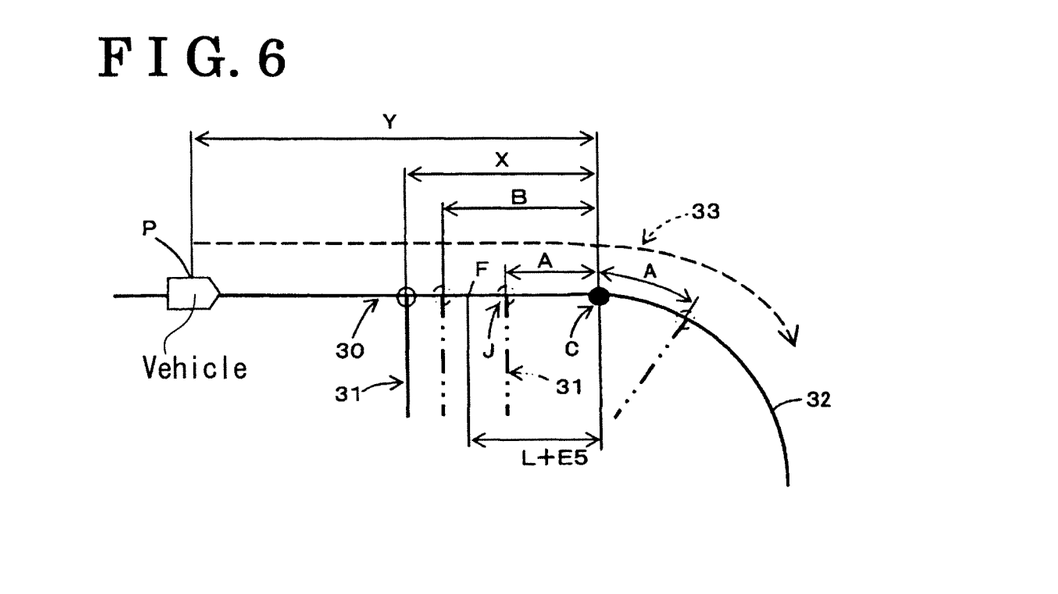
FIG. 6 is a diagram illustrating a route along which the vehicle is driven.

The location of the vehicle is measured by, for example, using a global positioning system (GPS) that utilizes electric waves transmitted from satellites. However, an error is caused between the actual location of the vehicle and the measured location of the vehicle. Hence, a distance error E1 of several tens of meters is added to a location P of the vehicle (hereinafter referred to as a vehicle location P) in order to off set the distance error between the actual vehicle location P and the measured vehicle location. This is because the GPS has a limited measurement resolution, and there are time lags between the time when the electric wave transmitted from each of the satellites reaches the vehicle.

Additionally, the curve starting point C included in the curve information also has a distance error E2 of several tens of meters. The car navigation system 21 forms an arc running close continuous points, for example four complementing points, exist along a route on the electronic map date. When a radius of the arc exceeds a threshold, the car navigation system 21 determines that the arc formed by connecting the complementing points on the route indicates a straight road. When the radius of the arc does not exceed the threshold, the car navigation system 21 determines that the arc indicates a curve. When a first set of the complementing points indicates the straight road, and a second set of the four complementing points indicates the curve, the car navigation system 21 determines the first complementing point of the second set of the complementing points as the curve starting point C. Generally, when the car navigation system 21 forms the arc around the curve starting point C, the arc is formed so as to run close both the complementing points of the straight road and the complementing points of the curve. Therefore, the car navigation system 21 tends to form the arc having a larger radius around the curve starting point C. Consequently, the car navigation system 21 may not accurately determines the curve starting point C. Hence, the distance error E2 is added to the curve starting point C.

As the preparatory supporting operation needs to be executed before the side support ECU 20 executes the main supporting operation, the side support ECU 20 sets the control starting point F closer to the vehicle before reaching the curve starting point C, by taking into account the distance error E1 of the vehicle position P and the distance error E2 of the curve starting point C. In other words, the side support ECU 20 set the control starting point F closer to the vehicle before reaching the curve starting point C for a distance that corresponds to the sum of the distance L and a calculated distance error E5 calculated by adding the distance error E1 and the distance error E2, then the side support ECU 20 memorizes the preparatory support control starting point F in S25.

The side support ECU 20 compares the vehicle position P and the preparatory support control starting point F in S26. When the side support ECU 20 determines that the vehicle position P does not correspond to the preparatory support control starting point F, in other words, when the vehicle does not reach the preparatory support control starting point F, the side support ECU 20 proceeds to the program end. When the vehicle position P corresponds to the preparatory support control starting point F, in other words, when the vehicle reaches the preparatory support control starting point F, the side support ECU 20 drives the right and the left motors 26 and 27 in order to move the right and the left side support portions 16 and 17 inwardly in the closing direction to the preparatory closed position set by the side support ECU 20 on the basis of the feedback signals inputted to the side support ECU 20 from the right and the left rotary encoders 28 and 29 (S27).

Additionally, in the above-mentioned case, the right and the left side support portions 16 and 17 are retained at the same position having a predetermined closing level until the lateral acceleration G exceeds the predetermined level. However, the side support portions 16 and 17 do not need to be retained at the preparatory closed position, but the closing level of the right and the left side support portions 16 and 17 may be changed so as to correspond to a size of the curve radius. Then, in the main support control, the side support ECU 20 controls the right and the left side support portions 16 and 17 so as to be positioned at a closed position having a larger closing level between the closing position calculated by the lateral acceleration G of the vehicle detected by the lateral acceleration sensor 23 and the preparatory closed position calculated in a process of the preparatory closed support control.

In this embodiment, the vehicle is assumed to be driven on the route 30 on which the intersection J exists between the vehicle position P and the curve starting point C. The driver may feel uncomfortable if the preparatory supporting control is executed to move the right and the left side support portions 16 and 17 to the preparatory closed position even though the vehicle is gone off the route 30 at the intersection J onto a branched road (fork road) 31. This so-called operational error on the preparatory supporting operation is caused because of the distance error of the vehicle position P, the distance error E2 of the curve starting point C, the distance error E3 of the intersection J, and because the side support ECU 20 takes time to determine whether the vehicle goes off the route 30 or not.

Figure 8:
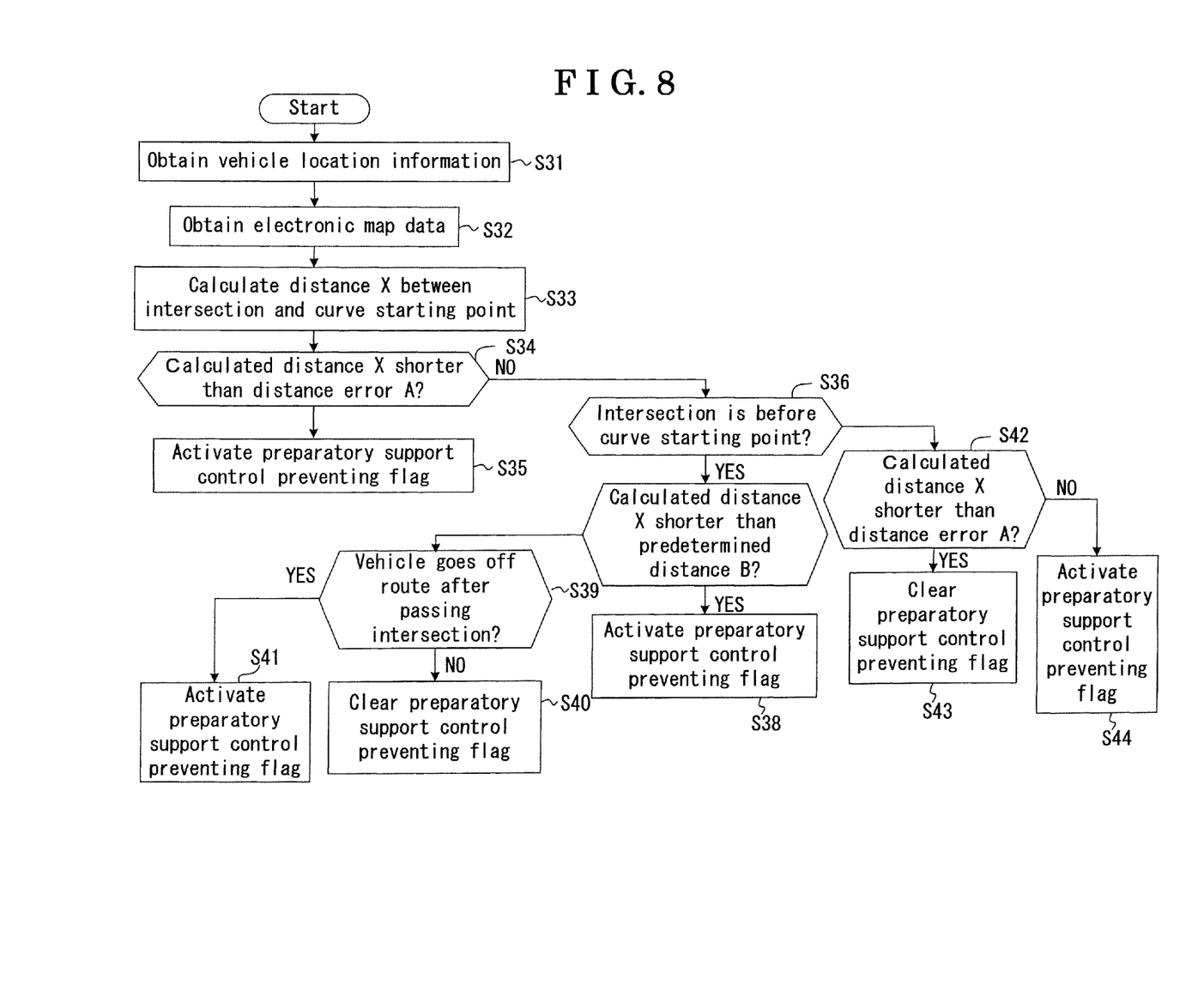
FIG. 8 is a flowchart illustrating an improper preparatory supporting operation preventing program.

In order to prevent of the preparatory supporting operation from being executed to the right and the left side support portions 16 and 17 when the vehicle turns at the corner of the intersection J to proceed along the fork road 31, the side support ECU 20 repeatedly executes the improper preparatory supporting operation preventing a program illustrated in a flowchart in FIG. 8.

The side support ECU 20 obtains the vehicle location information including the present position of the vehicle in S31 each time when the improper preparatory supporting operation preventing program is executed. Then, the side support ECU 20 obtains the road information (the electronic map data) around the predetermined distance Y ahead of the vehicle in the vehicle moving direction outputted from the car navigation system 21, and the side support ECU 20 memorizes the road information around the predetermined distance Y ahead the vehicle in S32. The side support ECU 20 calculates the intersection J and the curve starting point C, which exist ahead of the vehicle, along the route 30 based on the memorized electronic map data, and then the side support ECU 20 calculates a distance X between the intersection J and the curve starting point C in S33. The calculation of the distance X in S32 serves as the distance calculating means for calculating the distance between the intersection J and the curve starting point C, which exists ahead of the vehicle, based on the electronic map data.

The side support ECU 20 determines whether the calculated distance X is shorter than a distance error A calculated on the basis of map accuracy of the curve starting point C and the intersection J in S32. The distance error A added around the curve starting point C is memorized as an distance error calculated by adding the distance error E2 of the curve starting point C and the distance error E3 of the intersection J. The distance error A is calculated by simply adding the distance error E2 of the curve starting point C and the distance error E3 of the intersection J, but the distance error A may be calculated by adding the distance errors calculated on the basis of the distance errors fell into the normal distribution. The side support ECU 20 determines whether the calculated distance X is shorter than a distance error A calculated on the basis of map accuracy of the curve starting point C and the intersection J in S32. The distance error A added around the curve starting point C is memorized as an distance error calculated by adding the distance error E2 of the curve starting point C and the distance error E3 of the intersection J. The distance error A is calculated by simply adding the distance error E2 of the curve starting point C and the distance error E3 of the intersection J, but the distance error A may be calculated by adding the distance errors calculated on the basis of the distance errors fell into the normal distribution.

When the calculated distance X is longer than the distance error A, the side support ECU 20 determines whether the intersection J exists before the curve starting point C or not in S36. When the intersection J exists before reaching the curve starting point C, the side support ECU 20 determines whether the calculated distance X is shorter than a predetermined distance B or not in S 37. The predetermined distance B is calculated by adding a distance error E4, which is calculated on the basis of the map accuracy of the curve starting point and the intersection, and a distance necessary for the car navigation system 21 to determine whether the vehicle goes off the route 30 or not. The distance error E4 is memorized at the side support ECU 20 as a distance error calculated by adding the distance error E1 of the vehicle position P, the distance error E2 of the curve starting point C and the distance error E3 of the intersection J. The distance the side support ECU 20 needs to determines whether the vehicle goes off the route 30 or not is a distance necessary for the car navigation system 21 to execute map matching the branched road 31.

When the calculated distance X is shorter than the predetermined distance B, the side support ECU 20 does not determines whether the vehicle goes off the route 30 or not, the side support ECU 20 sets the preparatory support control preventing flag in S38. Hence, the preparatory supporting control is prevented from being executed when it is not clear whether the vehicle advances the curve 32 or not. As a result, the driver may not feel uncomfortable because of the right and the left side support portions 16 and 17 holding the driver's upper body at the preparatory closed position.

When the side support ECU 20 determines that the calculated distance X is longer than the predetermined distance B in S37, the side support ECU 20 determines whether information that the vehicle goes off the route 30 after the vehicle passes the intersection J is inputted from the car navigation system 21 in S39. When the vehicle does not go off the route 30 without proceeding to the branched road 31 at the rod fork J, the side support ECU 20 clears the preparatory support control preventing flag in S40. Hence, the preparatory supporting operation is executed when the side support ECU 20 accurately determines that the vehicle advances the curve 32 without proceeding to the branched road 31, by taking into account the distance error E1 of the vehicle position P, the distance error E2 of the curve starting point and the distance error E3 of the intersection J. As a result, the driver may not feel uncomfortable because of the right and the left side support portions 16 and 17 are controlled when the side support ECU 20 accurately determines that vehicle is advancing the curve 32.

When the side support ECU 20 determines that the vehicle turns at a corner of the intersection J to proceed along a fork road 30, the side support ECU 20 sets the preparatory support control preventing flag in S41. Hence, the preparatory supporting operation is prevented from being executed when the side support ECU 20 accurately determines that the vehicle proceeds to the ranched road 31, by taking into account the distance error E1 of the vehicle position P, the distance error E2 of the curve starting point and the distance error E3 of the intersection J. As a result, the driver may not feel uncomfortable because the right and the left side support portions 16 and 17*b* are not unnecessarily actuated when the side support ECU 20 accurately determines that the vehicle proceeds to the branched road 31.

When the side support ECU 20 determines that the intersection J exists beyond the curve starting point C in S36, the side support ECU 20 determines whether the calculated distance X is longer then the distance error A in S 42. When the side support ECU 20 determines that the calculated distance X is longer than the distance error A, the side support EUC 20 sets the preparatory support control preventing flag in S43. When the intersection J exists beyond the curve starting point C, and the calculated distance X between the intersection J and the curve starting point C is longer than the distance error E4 calculated on the bases of the map accuracy of the curve starting point and the intersection, it is certain that the curve starting point C is before the intersection J. Hence, there is no problem with executing the preparatory supporting operation. When the side support ECU 20 determines that the calculated distance X is shorter than the distance gap A in S41, the side support ECU turns on the preparatory support control preventing flag in S44.

A determining means is configured with the side support ECU 20, S34, S36, S37, S39, S42 and the like of the improper preparatory support control preventing program. A means for executing a control of the preparatory support control means (a means for executing a control of a support control means) is configured with the side support ECU 20, S35, S38, S41, S44 and the like of the improper preparatory support control preventing program A means for refraining a control of the preparatory support control means (a means for refraining a control of a support control means) is configured with the side support ECU 20, S40, S43 and the like of the improper preparatory support control preventing program.

According to the embodiment, the distance X between the intersection J and the curve starting point C exist on the route 30 ahead of the vehicle is calculated on the basis of the electronic map data. Then, the side support ECU 20 executes the preparatory support control or the improper preparatory supporting operation preventing control. Hence, the side support ECU 20 prevents the preparatory support control from being executed to the right and the left side support portions 16 and 17 when the road shape does not mach the map created based on the electronic map data. As a result, the driver may not feel uncomfortable because of the right and the left side support portions 16 and 17 being unnecessarily actuated.

According to the embodiment, the determining means determines not to execute the control of the support control means when the calculated distance X is shorter than the distance error A that is calculated on the basis of the map accuracy of curve starting point C and the map accuracy of the intersection J.

Accordingly, when the calculated distance X between the intersection J and the curve starting point C is shorter than the distance error A calculated on the basis of the map accuracy of the curve starting point C and the intersection J, the side support ECU 20 executes the improper preparatory supporting operation preventing program. Hence, the side support ECU 20 prevents the preparatory support control from being executed to the right and the left side support portions 16 and 17 when it is not clear whether the vehicle is advanced towards the curve 32 or not. As a result, the driver may not feel uncomfortable because of the right and the left side support portions 16 and 17 being unnecessarily actuated.

According to the embodiment, the determining means determines not to execute the control of the support control means when the intersection J exists before the curve starting point C, and when the calculated distance X is shorter than a predetermined distance B that is calculated by adding the distance necessary to determine whether or not the vehicle goes off the route 30 to the distance error A calculated on the basis of the map accuracy of the curve starting point C, the map accuracy of the intersection J, and the map accuracy of the vehicle location P.

Accordingly, when the intersection J exists before reaching the curve starting point C, and further, when the calculated distance X between the intersection J and the curve starting point C is shorter than the predetermined distance B, the side support ECU 20 executes the improper preparatory supporting operation preventing program. The predetermined distance B is calculated by adding the distance error A calculated on the basis of the map accuracy of the curve starting point C and the intersection J to the distance necessary for the side support ECU 20 to determine whether the vehicle goes off the route 30 or not. Hence, the side support ECU 20 prevents the preparatory supporting operation from being executed to the right and the left side support portions 16 and 17 when the vehicle proceeds to the branched road 31 under the condition where the side support ECU 20 does not determine whether the vehicle goes off the route 30 or not. As a result, the driver may not feel uncomfortable because of the right and the left side support portion 16 and 17 being unnecessarily actuated.

According to the embodiment, the determining means determines not to execute the control of the support control means when the intersection J exists before the curve starting point C, and when the calculated distance X is shorter than the predetermined distance B that is calculated by adding the distance necessary to determine whether or not the vehicle goes off the route 30 to the distance error A calculated on the basis of the map accuracy of the curve starting point C, the map accuracy of the intersection J, and the map accuracy of the vehicle location P, and further when the determining means detects information that the vehicle goes off the route 30 after the vehicle passes the intersection J.

Accordingly, when the intersection J exists before reaching the curve starting point C, and when the calculated distance X between the intersection J and the curve starting point C is longer than the predetermined distance B, and further, when the information that the vehicle goes off the route 30 is inputted to the side support ECU 20 from the car navigation system 21 after the vehicle passes the intersection J, the side support ECU 20 executes the improper preparatory supporting operation preventing program. The predetermined distance B is calculated by adding the distance error A calculated on the basis of the map accuracy of the curve starting point and the intersection to the distance necessary for the side support ECU 20 to determines whether the vehicle goes off the route 30 or not. Hence, the preparatory supporting operation is executed when the side support ECU 20 accurately determines that the vehicle is advanced towards the curve 32 without proceeding to the branched road 31, by taking into account the distance error E1 of the vehicle position P, the distance error E2 of the curve starting point C and the distance error E3 of the intersection J. As a result, the driver may not feel uncomfortable because of the right and the left side support portions 16 and 17 being unnecessarily actuated.

According to the embodiment, the determining means determines to execute the control of the support control means when the intersection J exists before the curve starting point C, and when the calculated distance X is longer than the predetermined distance B that is calculated by adding the distance necessary to determine whether or not the vehicle goes off the route 30 to the distance error A calculated on the basis of the map accuracy of the curve starting point C and the map accuracy of the intersection J, and further when the determining means does not detect information that the vehicle goes off the route 30 after the vehicle passes the intersection J.

Accordingly, the intersection J exists before reaching the curve starting point C, and when the calculated distance X between the intersection J and the curve starting point C is longer than the predetermined distance B, and further when the information that the vehicle goes off the route 30 is not inputted to the side support ECU 20 from the car navigation system 21 after the vehicle passes the intersection J, the side support ECU 20 executes the preparatory support control. The predetermined distance B is calculated by adding the distance error A calculated on the basis of the map accuracy of the curve starting point and the intersection to the distance necessary for the side support ECU 20 to determines whether the vehicle goes off the route 30 or not. Hence, the preparatory supporting operation is executed when the side support ECU 20 accurately determine that the vehicle is advanced towards the curve 32 without proceeding to the branched road 31, by taking into account the distance error E1 of the vehicle position P, the distance error E2 of the curve starting point C and the distance error E3 of the intersection J. As a result, the driver may not feel uncomfortable because of the right and the left side support portions 16 and 17 being unnecessarily actuated.

According to the embodiment, the determining means determines to execute the control of the support control means when the intersection J exists beyond the curve starting point C, and when the calculated distance X is longer than the predetermined distance B that is calculated by adding the distance necessary to determine whether the vehicle goes off the route 30 to the distance error A calculated on the basis of the map accuracy of the curve starting point C and the intersection J.

Accordingly, when the intersection J exists beyond the curve starting point C, and further, when the calculated distance X between the intersection J and the curve starting point C is longer than the distance error A calculated on the basis of the map accuracy of the curve starting point C and the intersection J, the side support ECU 20 determines that the curve starting point C certainly exists before reaching the intersection J, and then the side support ECU 20 executes the preparatory supporting operation based on the electronic map data.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
main support control means for moving a side support portion of a seat in the vehicle in a first direction and in a second direction depending on an actual lateral acceleration of the vehicle so as to stabilize a posture of an occupant in the seat, the side support portion being moved by a reduction-mechanism-equipped, electrically operated motor provided at the seat of the vehicle;
support control means for operating the side support portion based on electronic map data before the vehicle reaches a curve starting point;
distance calculating means for calculating a distance between an intersection and the curve starting point based on the electronic map data, the intersection and the curve starting point existing ahead of the vehicle along a driving route;
determining means for determining whether or not control of the support control means is executed based on an evaluation of a difference between the calculated distance and electronic map data accuracy with respect to a corresponding distance parameter thereof;
means for executing the control of the support control means based on a result of the evaluation of the determining means; and
means for preventing the control of the support control means when the result of the determining means exceeds a predetermined value, which value is determined based on a comfort level of the occupant.

2. The seat apparatus for the vehicle according to claim 1, wherein the determining means determines not to execute the control of the support control means when the calculated distance is shorter than a distance error that is calculated based on map accuracy of the curve starting point and map accuracy of the intersection.

3. The seat apparatus for the vehicle according to claim 1, wherein the determining means determines not to execute the control of the support control means when the intersection exists before the curve starting point, and when the calculated distance is shorter than a predetermined distance that is calculated by adding a distance necessary to determine whether or not the vehicle goes off the driving route to a distance error calculated based on map accuracy of the curve starting point, map accuracy of the intersection, and map accuracy of a location of the vehicle.

4. The seat apparatus for the vehicle according to claim 1, wherein the determining means determines not to execute the control of the support control means when the intersection exists before the curve starting point, and when the calculated distance is longer than a predetermined distance that is calculated by adding a distance necessary to determine whether or not the vehicle goes off the driving route to a distance error calculated based on map accuracy of the curve starting point, map accuracy of the intersection, and map accuracy of a location of the vehicle, and further when the determining means detects information that the vehicle goes off the driving route after the vehicle passes the intersection.

5. The seat apparatus for the vehicle according to claim 1, wherein the determining means determine to execute the control of the support control means when the intersection exists before the curve starting point, and when the calculated distance is longer than a predetermined distance that is calculated by adding a distance necessary to determine whether or not the vehicle goes off the driving route to a distance error calculated based on map accuracy of the curve starting point and map accuracy of the intersection, and further when the determining means does not detect information that the vehicle goes off the driving route after the vehicle passes the intersection.

6. The seat apparatus for the vehicle according to claim 1, wherein the determining means determines to execute the control of the support control means when the intersection exists beyond the curve starting point, and when the calculated distance is longer than a predetermined distance that is calculated by adding a distance necessary to determine whether the vehicle goes off the driving route to a distance error calculated based on map accuracy of the curve starting point and the intersection.

7. The seat apparatus for the vehicle according to claim 1, wherein the side support portion stabilizes the posture of the occupant in the seat by pressing an upper body portion of the occupant.

8. The seat apparatus for the vehicle according to claim 1, wherein the side support portion includes a right support frame and a left support frame disposed on right and left sides of the seat, respectively, the right and left support frames being pivotable against an upper body portion of the occupant.

9. The seat apparatus for the vehicle according to claim 1, wherein, when stabilizing the posture of the occupant in the seat, the side support portion is moved to a closing level that corresponds to a predetermined level of lateral acceleration of the vehicle.

10. An apparatus, comprising:
   a seat in a vehicle, the seat including upper body side support portions;
   main support control means for moving the upper body side support portions depending on an actual lateral acceleration of the vehicle so as to stabilize a posture of an occupant in the seat;
   support control means for operating the upper body side support portions based on electronic map data before the vehicle reaches a curve starting point; and
   determining means for determining whether the vehicle will advance through a curve in the road based on a result of an evaluation of a difference between a calculated distance and electronic map data accuracy, with respect to a corresponding distance parameter thereof,
   wherein when the result of the determining means exceeds a predetermined value, the support control means is prevented from controlling the upper body side support portions, and
   wherein when the determining means determines that the vehicle will advance through the curve in the road, the support control means operates the upper body side support portions to stabilize the posture of the occupant in the seat.

11. The apparatus according to claim 10, further comprising distance calculating means for calculating the calculated distance, which distance is between an intersection and the curve starting point based on the electronic map data, the intersection and the curve starting point existing ahead of the vehicle along a driving route.

12. An apparatus, comprising:
   a seat in a vehicle, the seat including upper body side support portions; and
   an electronic control unit that determines whether to move a side support portion of the seat depending on an actual lateral acceleration of the vehicle so as to stabilize a posture of an occupant in the seat, the side support portion being moved by a driving portion provided at the seat of the vehicle, the electronic control unit including a computer-readable storage medium that includes computer executable instructions, where the instructions, when executed by a processor, cause the processor to perform a method including the steps of
   calculating a distance between an intersection and a curve starting point of a curve of the road based on electronic map data, the intersection and the curve starting point existing ahead of the vehicle along a driving route,
   determining whether the vehicle will advance through the curve based on at least a result of an evaluation of a difference between the calculated distance and electronic map data accuracy with respect to a corresponding distance parameter thereof,
   operating the side support portion, when it is determined that the vehicle will advance through the curve, before the vehicle reaches the curve starting point, and
   preventing operation of the side support portion, when it is determined that the vehicle will not advance through the curve.

13. The apparatus according to claim 12, wherein the electronic control unit does not operate the side support portion when the calculated distance is shorter than a distance error that is calculated based on map accuracy of the curve starting point and map accuracy of the intersection.

* * * * *